May 2, 1950 C. S. SIMPELAAR 2,505,996
DAMPER TO CONTROL GAS FLOW
Filed Aug. 13, 1945 2 Sheets-Sheet 1
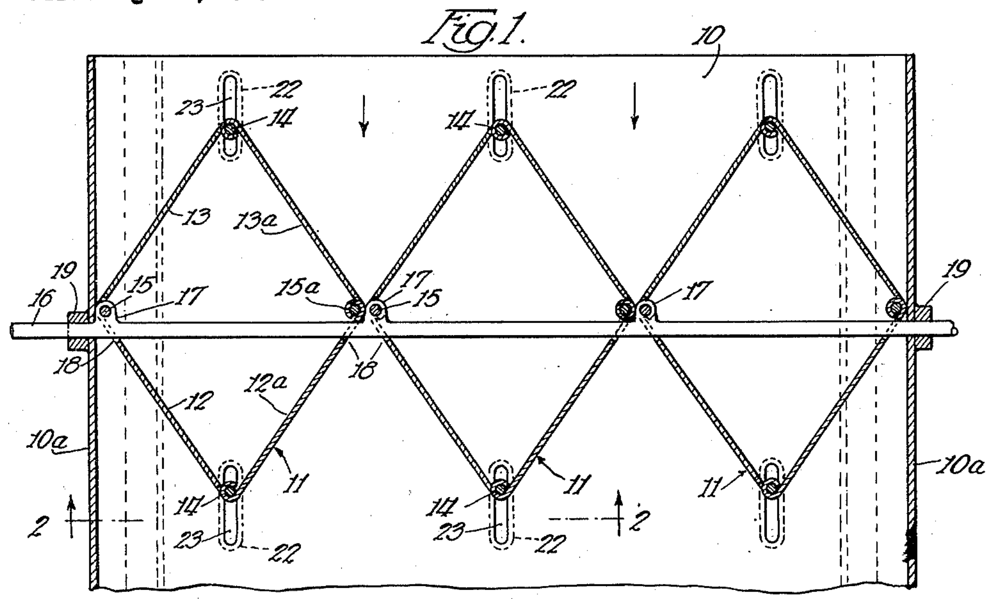
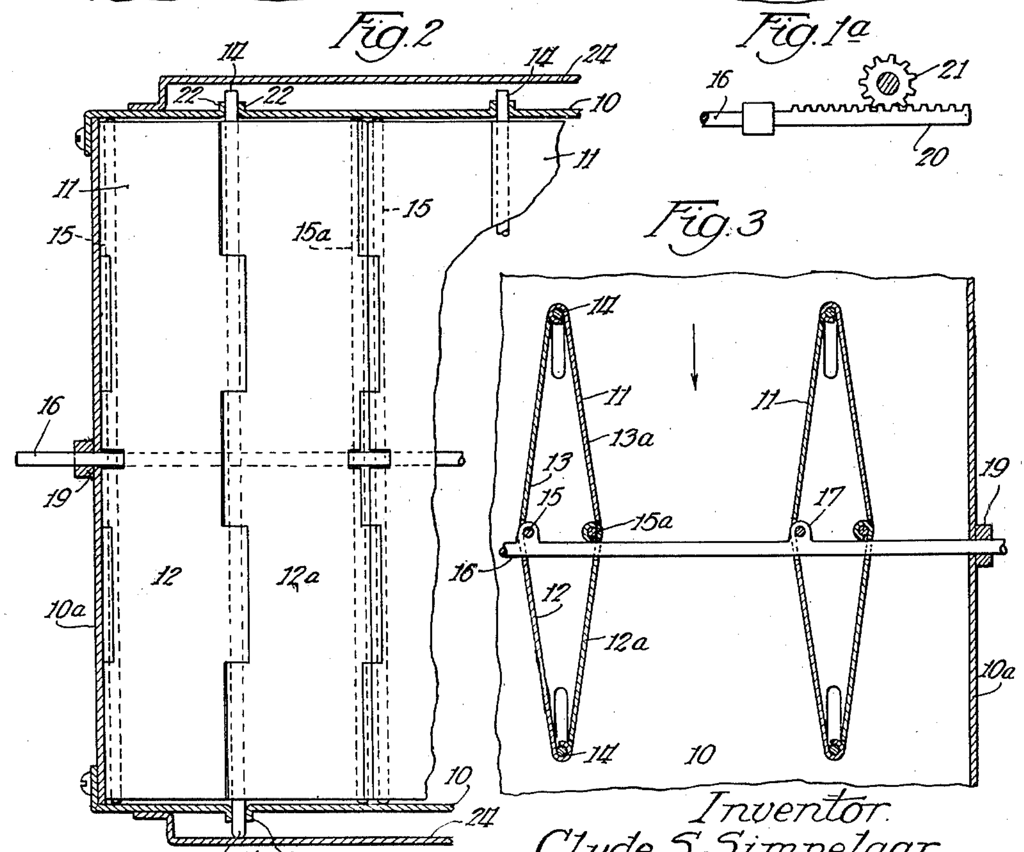
Witness:
V. Siljander
By: [signature] Attys.

DAMPER TO CONTROL GAS FLOW
Filed Aug. 13, 1945 2 Sheets-Sheet 2
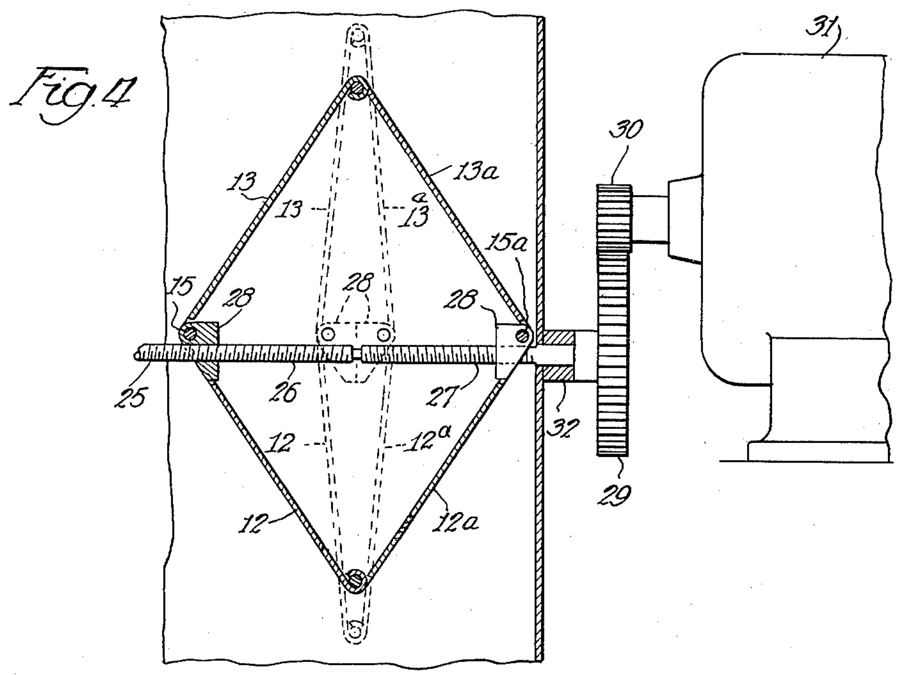
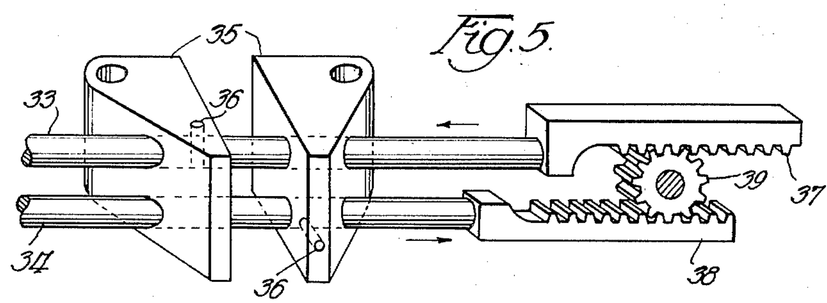
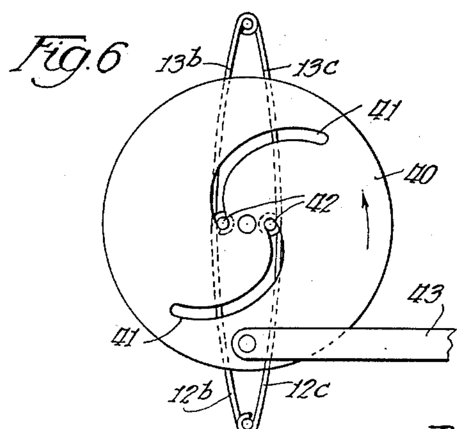
Inventor
Clyde S. Simpelaar
Witness:
V. Siljander
By: Stice & Stice Attys.

Patented May 2, 1950 2,505,996

UNITED STATES PATENT OFFICE 2,505,996

DAMPER TO CONTROL GAS FLOW

Clyde S. Simpelaar, Racine, Wis., assignor to Modine Manufacturing Company, Racine, Wis., a corporation of Wisconsin Application August 13, 1945, Serial No. 610,435

9 Claims. (Cl. 126—285)

1

This invention relates to a damper to control gas flow. One of the objects of this invention is the provision of a damper consisting of one or more damper elements operating on the principle of a pantograph and employing operating means for opening and closing the damper in a casing or gas conveying duct.

Another object is the provision of a damper which provides for uniform air flow through its entire area without any material change in the direction of air flow.

Another object is the provision of a damper which minimizes the stratification of gas as a result of the nondeflection of the gas flow.

Another object is the provision of a damper having a lower resistance to the gas flow in all of its open positions.

Another object is the provision of damper elements which are rigidly positioned and not subject to flutter.

Another object is the provision of a damper capable of being operated by low power and adapted for all types of automatic control.

Another object is to provide a damper requiring a very small amount of motion to open and close.

Another object is to provide a damper which when in closed position tends to be held closed by the pressure of gas thereon.

With these and other objects and advantages in view, this invention consists in the several novel features of construction, arrangement and combination of parts hereinafter fully set forth and more particularly defined in the appended claims.

The invention is clearly illustrated in the drawings accompanying this specification in which:

Fig. 1 is a horizontal section taken through a fragment of a casing or duct and illustrating a simple embodiment of the invention mounted therein;

Fig. 1*a* is a detail plan of one form of actuating means for the operating rod seen in Fig. 1;

Fig. 2 is a vertical, longitudinal, fragmental section taken on the line 2—2 of Fig. 1;

Fig. 3 is a horizontal section through a fragment of the casing or duct and two of the damper elements seen in Fig. 1, but showing the damper in open position;

Fig. 4 is a view partly in side elevation and partly in vertical longitudinal section showing a modified form of damper operating means;

Fig. 5 is a perspective view of another modified form of damper operating means; and

2

Fig. 6 is a plan view illustrating a third modified form of damper operating means.

Referring to said drawings, and first to Figs. 1 to 3 inclusive, the reference characters 10, 10 designate the top and bottom walls and **10*a*, 10*a*** the side walls of a casing or duct for conducting gas or air in which casing or duct the damper, forming the subject matter of this specification, is mounted.

The damper may consist of one or several damper elements 11, each consisting of four leaves 12, 13, **12*a*, 13*a* hinged together at their edges by hinge pins 14, 15 and 15*a*** to provide a structure in the form of a parallelogram. Each leaf comprises one side of the parallelogram. When extended to their full width, the damper elements close the passageway through the casing or duct, as is seen in Fig. 1, to prevent the passage of gas or air past the damper, and by collapsing the damper elements more or less, the passage through the casing is opened, as seen in Fig. 3.

Means are provided for expanding and collapsing the damper elements and the operating means shown in Figs. 1 to 3 inclusive illustrate a very simple operating means. Extending through the casing and projecting therefrom is an operating rod 16 which also extends through the leaves 12, **12*a* of the damper elements and is connected to the hinge pin 15 of each damper element by ears 17. The operating rod is located adjacent the hinge pins 15, 15*a* and extends through holes 18 in the leaves 12, 12*a* and is supported from the side walls 10*a* of the casing or duct by bearing boxes 19 mounted on the side walls 10*a*. The rod may be reciprocated by any suitable driving mechanism, such as a rack bar 20** (see Fig. 1*a*) connected to one end of the operating rod 16 and meshing with a pinion 21 driven from any suitable source of power, or in smaller installations the rod may be manually operated. When a reciprocating operating rod is employed it is necessary to guide the hinge pins 14 of the damper elements to move in lines at right angles to the line of movement of the operating rod, and for this purpose the hinge pins 14 are shown as extended beyond the top and bottom walls of the casing and travel in guideways, here shown as formed by slots 23 between flanges 22 provided on the top and bottom walls of the casing. To prevent the escape of gas through the slots 23, covers 24 are secured to the top and bottom walls and enclose the slots.

In some cases the damper elements may be carried by the operating rod, although if desired the downwardly extending projections of the hinge pins 14 may rest upon and travel on the bottom cover 24 and thus assist in supporting the damper elements.

In operation, the damper is opened to permit the passage of gas or air by drawing the operating rod 16 toward the right, as viewed in Fig. 1, thereby swinging the leaves 12, 13 toward the right, causing the hinge pins 14 to travel in opposite directions at right angles to the length of the operating rod and thereby swinging the leaves 12, 13 toward the leaves 12*a*, 13*a*, bringing the leaves into the position shown in Fig. 3 when the damper is fully open. Obviously the damper may be opened more or less as the case may be. To close or partially close the damper, the operating rod 16 is moved towards the left, as viewed in Fig. 1, thereby reversing the motion of the leaves.

The hinge pin 15*a* at one side of the damper element may be held stationary and the operating rod may be connected to the other hinge pin 15.

A modified form of operating means is illustrated in Figure 4. In this form, a rotatory operating rod 25 is shown. This operating rod 25 is provided with right and left hand screw threads 26, 27 for each damper element and threaded in floating nuts 28 that are provided, one hinged to each hinge pin 15 or 15*a* and located in the interior of each damper element. Preferably the floating nuts are tapered from the hinge connection with the hinge pins to enable the damper element to be collapsed a maximum distance.

The operating rod 25 may be rotated by suitable driving mechanism, the one illustrated being in the form of a gear wheel 29 on the end of the rod 25 and meshing with a pinion 30 driven from any suitable source of power, such as a reversing motor 31. If necessary, a suitable speed reducing gearing may be interposed between the motor and the operating rod.

Bearing blocks, one of which is seen at 32 and supported by the casing walls, are provided for supporting the operating rod. When the operating rod is rotated in one direction the floating nuts 28 and therewith the leaves of the damper element are drawn toward each other to the position indicated in dotted lines in Fig. 4. When the modified form of operating rod just described is used the guideways for the hinge pins described in connection with the form of operating means illustrated in Figs. 1 to 3 inclusive may be omitted inasmuch as each side of the damper element is moved by the operating rod.

A modified form of the push and pull type of operating rod is illustrated in Fig. 5. Two oppositely movable rods 33, 34 are employed in this form of operating means. These rods extend through holes in hinge blocks 35 which are hinged to the hinge pins in the same manner as the floating nuts 28 are hinged. Each rod 33 and 34 is pinned to one of the floating blocks 35 as by a pin 36 and slides freely through the hole in the other floating block. Means are provided for simultaneously moving the two rods 33, 34 in opposite directions, said means being shown as comprising rack bars 37, 38 on the end of the rods which rack bars mesh with a suitably driven pinion 39. By rotating the pinion in one direction the rods are moved in opposite directions to distend the damper element, and when the pinion is rotated in the opposite direction the rods are moved to collapse the damper element.

In Fig. 6 is illustrated operating means for smaller damper elements and, as shown, said means comprises a cam disc 40 having curved cam slots 41 that run from points adjacent the center of the disc to points adjacent its periphery. The hinge pins 42 of the damper element engage in the cam slots, and by partially rotating the cam disc, the hinge pins are spread apart or brought toward each other, thereby extending or collapsing the damper element, depending on the direction in which the disc is rotated. A link 43 pivotally connected to the disc 40 may be employed to rotate the disc.

It is to be understood that each of the forms of operating means above described may be used in connection with one damper element or several of them placed side by side.

The damper leaves may be flat sheets as shown in most of the figures of the drawings, or they may be curved slightly as seen at 12*b*, 12*c*, 13*b*, 13*c* in Fig. 6 for the purpose of stream lining the damper elements.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A damper to control gas flow comprising in combination a casing, a damper element therein and consisting of four leaves hinged together at their edges to form an extensible and collapsible structure in the form of a parallelogram, an operating rod operatively connected to a member of the damper element for extending and collapsing the same, and guide means for two of the opposite hinges of the damper element for guiding the same for movement in a straight line at right angles to the length of the operating rod.

2. A damper to control gas flow comprising in combination a casing through which gas flows, several similar damper elements each consisting of four leaves hinged together at their edges to form an extensible and collapsible structure in the form of a parallelogram, the several damper elements when extended extending across the passageway in the casing and when collapsed closing the passageway through the casing, and operating means operatively connected to a corresponding member of each damper element.

3. A damper to control gas flow comprising several similar damper elements each consisting of four leaves hinged together at their edges to form an extensible and collapsible structure in the form of a parallelogram, and operating means operatively connected to said damper elements for extending and collapsing the same.

4. A damper to control gas flow comprising in combination a casing through which gas flows, several similar damper elements each comprising four leaves hinged together at their edges to form a structure in the form of a parallelogram, the several damper elements adapted when extended to extend across the casing passageway, and operating means connected to said damper elements for extending and collapsing the same.

5. A damper to control gas flow comprising in combination a casing through which gas flows, several similar damper elements each comprising four leaves hinged together at their edges to form a structure in the form of a parallelogram, the several damper elements adapted when extended to extend across the passageway through the casing, and operating means having a rod operatively connected to the several damper elements and adapted when moved in one direction to extend the damper elements and when moved in the opposite direction to collapse the same.

6. A damper to control gas flow comprising in combination a casing, several similar damper elements therein and each consisting of four leaves hinged together to form an extensible and collapsible structure in the form of a parallelogram, an operating rod operatively connected to a corresponding member of each damper element for extending and collapsing the same, and guide means for two of the opposite hinges of each damper element for guiding the same for movement in a straight line at right angles to the length of the operating rod.

7. A damper to control gas flow comprising in combination a casing through which the gas flows, a damper element consisting of four leaves hinged together at their edges to form an extensible and collapsible structure in the form of a parallelogram, floating nuts connected to two oppositely disposed hinge pins of the damper element and a rotatory operating rod threaded in said floating nuts.

8. A damper to control gas flow comprising in combination a casing through which the gas flows, a damper element consisting of four leaves hinged together at their edges to form an extensible and collapsible structure in the form of a parallelogram, floating blocks hingedly connected to two oppositely disposed hinge pins of the damper element, two operating rods extending through holes in said floating blocks and each fastened to one floating block, and means to simultaneously reciprocate the rods in opposite directions.

9. A damper to control gas flow comprising in combination a casing through which the gas flows, a damper element consisting of four leaves hinged together at their edges to form an extensible and collapsible structure in the form of a parallelogram, a cam disc having cam slots therein in which two oppositely disposed hinge pins of the damper element are engaged, and means to partially rotate the cam disc.

CLYDE S. SIMPELAAR.

REFERENCES CITED

The following references are of record in the file of this patent:

UNITED STATES PATENTS

| Number | Name | Date |
|---|---|---|
| 702,146 | McCloud | June 10, 1902 |
| 857,642 | Lorenz | June 25, 1907 |
| 1,862,272 | Ludwig | June 7, 1932 |
| 1,931,263 | McKnight | Oct. 17, 1933 |
| 2,149,976 | McKnight | Mar. 7, 1939 |

FOREIGN PATENTS

| Number | Country | Date |
|---|---|---|
| 375,884 | Germany | May 23, 1923 |
| 598,570 | Germany | June 15, 1934 |